(No Model.) 3 Sheets—Sheet 1.

J. TRUEB.

THERMOMETRIC REGULATOR FOR HEATING APPARATUS.

No. 354,522. Patented Dec. 14, 1886.

(No Model.) 3 Sheets—Sheet 2.

J. TRUEB.
THERMOMETRIC REGULATOR FOR HEATING APPARATUS.

No. 354,522. Patented Dec. 14, 1886.

(No Model.) 3 Sheets—Sheet 3.

J. TRUEB.
THERMOMETRIC REGULATOR FOR HEATING APPARATUS.

No. 354,522. Patented Dec. 14, 1886.

WITNESSES:

INVENTOR
Jacob Trueb
BY Goepel & Raegener
ATTORNEYS.

UNITED STATES PATENT OFFICE.

JACOB TRUEB, OF NEW YORK, N. Y.

THERMOMETRIC REGULATOR FOR HEATING APPARATUS.

SPECIFICATION forming part of Letters Patent No. 354,522, dated December 14, 1886.

Application filed November 23, 1885. Serial No. 183,791. (No model.)

To all whom it may concern:

Be it known that I, JACOB TRUEB, of the city, county, and State of New York, have invented certain new and useful Improvements in Thermometric Regulators for Heating Apparatus, of which the following is a specification.

This invention relates to an improved thermometric regulator for steam, air, or hot-water heating systems, by which the heat is regulated automatically and retained at a certain fixed temperature; and it relates more especially to a regulator of that class in which one or more closed vessels or receptacles filled with a suitable expansible liquid are exposed to the action of the air in the building the heat of which is to be regulated, the closed vessels communicating with a cylinder and piston, so as to operate said piston by the expansion and contraction of said liquid, and actuate thereby an intermediate lever mechanism that is connected to the steam, water, or air supply valve of the heating apparatus, and adapted to open or close the valve, according as the temperature of the room rises or falls above or below a certain fixed temperature.

The invention consists of a novel combination of the closed vessels containing the expansible liquid with the actuating cylinder and piston; of devices for lubricating said cylinder and piston; of a novel mechanism for transmitting the motion of the piston to the supply-valve; of means for adjusting said transmitting mechanism so as to open or close the valve at the required degree of temperature; of a novel construction of the supply-valve, whereby the same is balanced by an auxiliary valve, so as to respond quickly to the different changes or position of the intermediate transmitting mechanism; and, lastly, of other details of construction and combination of parts, which will be more fully described hereinafter, and finally pointed out in the claims.

Figure 1:
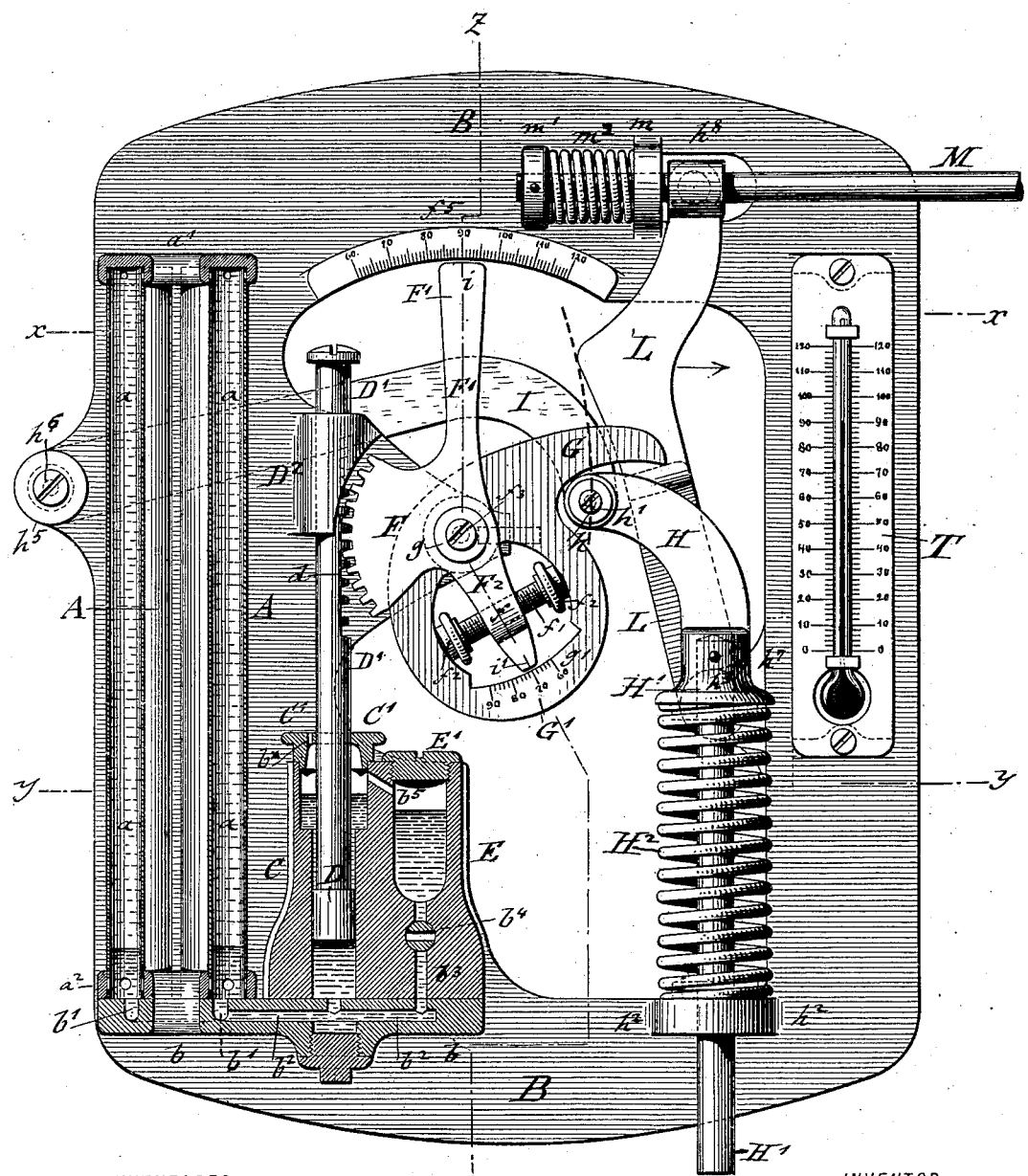
Figure 4:
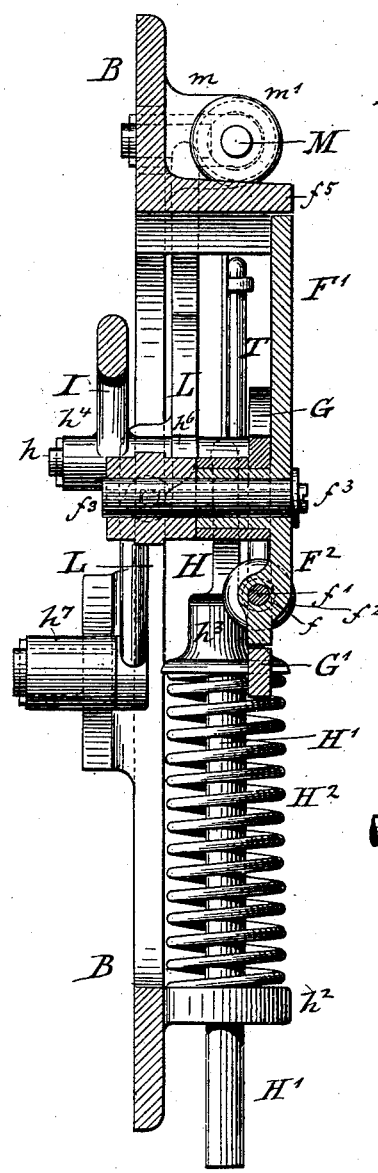
Figure 5:
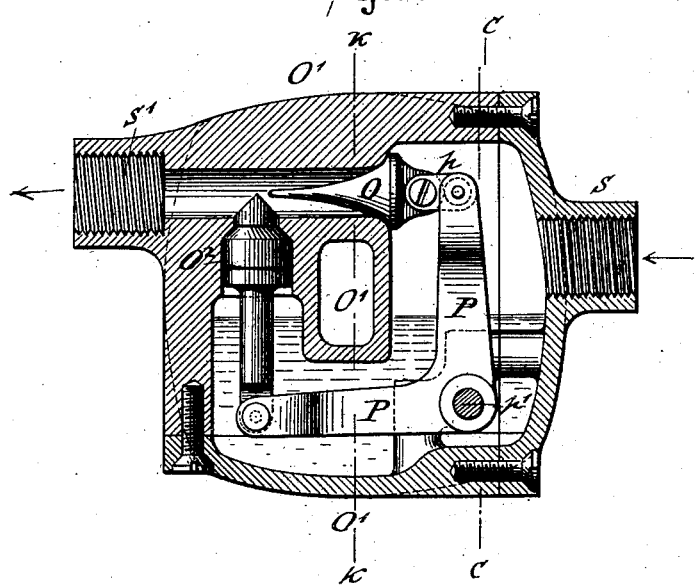
Figure 6:
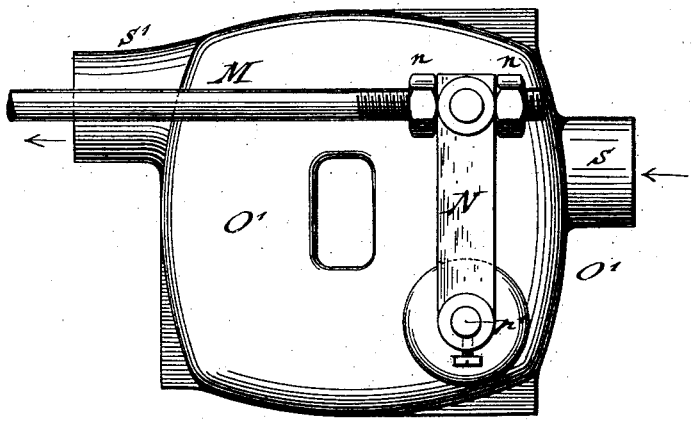

In the accompanying drawings, Figure 1 represents a front elevation, partly in section, of my improved thermometric regulator for heating apparatus. Figs. 2 and 3 are horizontal sections, respectively on line $x\ x$ and $y\ y$, Fig. 1. Fig. 4 is a vertical transverse section on line $z\ z$, Fig. 1; and Fig. 5 is a vertical longitudinal section of the supply apparatus or valve. Fig. 6 is a side elevation, and Figs. 7 and 8 are vertical transverse sections of the same, respectively on lines $c\ c$ and $k\ k$, Fig. 5.

Similar letters of reference indicate corresponding parts.

My improved regulator consists of three main parts: first, a closed apparatus filled with a liquid which by the influence of the temperature of the surrounding air is expanded or contracted so as to operate a piston guided in a uniformly-lubricated cylinder; secondly, a compound adjustable and spring-actuated lever mechanism that is operated by said piston; and, thirdly, of a supply apparatus or valve which is actuated by the intermediate lever mechanism, so as to regulate the supply of steam, hot water, or air to the pipes of the heating apparatus.

A in the drawings represents a closed vessel, which contains a suitable expansible liquid—such as mercury, spirits of turpentine, alcohol, &c.—and which vessel is composed preferably of a number of vertical wrought-iron tubes, $a\ a$, that are closed at the top by a cast-iron cap, $a'$, and connected tightly at the lower ends by a cast-iron collar, $a^2$, and suitable packing, with a horizontal bracket, $b$, of the supporting main plate B. The lower collar, $a^2$, is flanged and attached by screws $a^3$ to the bracket $b$, as shown in Fig. 3. The lower ends of the tubes $a\ a$ communicate with an annular channel, $b'$, in the bracket $b$, which channel is connected by a channel, $b^2$, with a vertical cylinder, C, that is also supported on the bracket $b$, and closed by a cap, C′, having an air-vent hole, $b^\times$. In the cylinder C is guided a nicely-fitting piston, D, the piston-rod D′ of which is guided by the cap C′ and by a sleeve-shaped bearing, $D^2$, cast integral with the supporting-plate B. The cylinder C and piston D are lubricated by a certain quantity of oil, which fills the connecting-channels $b'\ b^2$, the space below the liquid in the tubes $a\ a$, and the space above and below the piston D. The oil is supplied from an oil-receptacle, E, which is arranged sidewise of the piston, closed by a screw-cap, E′, and connected by a vertical channel, $b^3$, with the channel $b^2$ of the bracket $b$. A stop-cock, $b^4$, in the vertical channel $b^3$ serves to close or establish the communication between the channels $b^2$ $b^3$ and the cylinder C.

The cylinder C and the oil-receptacle E are made in one casting that is supported by the bracket $b$, as shown in Figs. 1 and 3. The upper part of the wall of the cylinder C is made thinner than the lower part, and connected with the oil-receptacle E by an inclined channel, $b^6$, through which the oil that passes up between the piston and the inner wall of the cylinder is reconducted to the oil-receptacle. By this gradual upward passage of the oil in the cylinder C the relative position of the oil in the cylinder and the receptacle is slowly changed, whereby the accurate working of the apparatus might be impaired.

To supply the required quantity of oil to the space below the piston D, the stop-cock $b^4$ is opened from time to time, so that the oil can pass through the channels $b^3$ $b^2$ to the lower part of the cylinder C. The stop-cock $b^4$ is then closed again and the piston resumes its regular normal position.

The piston-rod D' is preferably made in one piece with the piston D, and provided at its upper end with a rack, $d$, which meshes with a toothed segment, F, having an upwardly-extending arm, F', provided with an index-mark, $i$, and a downwardly-extending arm, $F^2$, also provided with an index-mark, $i'$. The downwardly-extending arm $F^2$ carries in a sleeve-shaped portion, $f$, having an interior screw-thread, a transverse set-screw, $f'$, to the ends of which are applied adjusting-nuts $f^2$. The hub of the toothed segment F turns on a fixed pin, $f^3$, which is supported by a socket, $f^4$, that is cast integral with the supporting-plate B, said segment being retained on the pin $f^3$ by a washer and set-screw. The longer upwardly-extending arm F' serves as a pointer, and moves along a graduated scale, $f^5$, at the upper part of the plate B. The position of the arm F' indicates the temperature of the building within which the regulating apparatus is located.

A thermometer, T, is arranged at any suitable point on the supporting-plate B, and is used for comparing the temperature indicated by it with the temperature indicated on the scale $f^5$ by the arm F' of the regulating apparatus, and for readjusting said arm when there is a difference between the temperature indicated by the thermometer and the temperature indicated by the arm F'. The temperature indicated by the arm F' on the graduated scale $f^5$ should always correspond to the temperature indicated by the thermometer T. As soon as there is a difference between the temperature indicated by the thermometer and the arm F' the position of the piston has to be readjusted. This is readily accomplished by setting the arm F' on the scale $f^5$ to the temperature indicated by the thermometer and then opening the stop-cock $b^4$, so as to readjust the oil in the cylinder below the piston by means of the oil-receptacle.

The toothed segment F is connected by the arm $F^2$, its set-screw $f'$, and the screw-nuts $f^2$, with the ring-shaped lower part, G', of a lever-arm G. The lever-arm G turns by a hub, $g$, on the pin $f^3$ of the segment F. The position of the lever-arm G with regard to the segment F is adjusted by the set-screw $f'$ and the screw-nuts $f^2$, one of which is secured rigidly to the set-screw $f'$, while the other turns loosely thereon, and serves to establish the rigid connection of the set-screw $f'$ with the ring-shaped part G'. The lower part of the ring-shaped part G' is provided with a graduated scale, $g'$, by which the part G' is set to the index-point $i$ of the arm $F^2$, and thereby the lever-arm G shifted to a higher or lower position, according as a higher or lower temperature is desired in the rooms to be heated. The graduated scale $g'$ indicates the degree of temperature at which the surrounding air has to be kept by the automatic functioning of the regulating apparatus. The curved arm G bears on an anti-friction roller $h'$ of a pivot-pin, $h$, that connects the transmitting-lever H and its steadying-lever I. The lever-arm G is so curved that it exerts in the different positions of the pivot $h$ and the levers H and I a uniform pressure on the piston D, and by the same on the liquid in the closed vessel A. The lever H is pivoted at its lower end to the head of an extension-rod, H', which passes through a perforated ear, $h^2$, of the supporting-plate B, and is guided thereby. Between the ear $h^2$ and the head $h^3$ of the lever H is interposed a strong spiral spring, $H^2$. The steadying-lever I is applied by a sleeve, $h^4$, to the rear end of the pivot $h$, back of the supporting-plate B, and by a pivot, $h^6$, at its opposite end to a socket, $h^5$, of the same, as shown in Figs. 1 and 2. The pressure of the spring $H^2$ is transmitted, by lever H, lever-arm $G^7$, segment F, cylinder C, and piston D, to the liquid in the regulating-tubes $a$ $a$. By altering the relative position of the curved lever-arm G to the toothed segment F by means of the ring-shaped part G', set-screw $f'$, and nuts $f^2 f^2$, the tension of the spring $H^2$ can be regulated so that it accomplishes the opening of the supply-valve O at the exact temperature which the arm $F^2$ indicates on the ring-shaped part G. The opening and closing of the supply-valve will take place according to the degree of temperature indicated by the arm $F^2$ on the scale $g'$.

When the arm $F^2$ has been set for a higher or lower degree of temperature, the temperature of the room within which the regulating apparatus is located will be raised or lowered to correspond thereto, and controlled by the arm F' and scale $f^5$ and thermometer T.

The lever I guides the spring-pressed lever H in its upward and downward motion and causes it to move through the arc of a circle. The pivot $h$ is further provided, intermediately between the hubs of the levers H and I, with a second anti-friction roller, $h^6$, against which bears a bent lever-arm, L, that is pivoted at its lower end to a socket, $h^7$, of the supporting-plate B, and at its upper end to a fixed sleeve, $h^8$, of a connecting-rod, M, as shown in Figs. 1 and 4. The opposite end of the rod M is attached by screw-nuts $n\ n$ to a lever-arm, N, by which the supply-valve O of the heating apparatus is opened or closed, as shown in Fig. 6.

The connecting-rod M is guided in a lug, $m$, of the supporting-plate B, and provided at the end next adjoining the lug $m$ with a collar, $m'$, between which and the lug $m$ a spiral spring, $m^2$, is interposed. The spiral spring $m^2$ exerts a pressure on the connecting-rod M, and serves to keep the supply-valve in closed position until the tension of the spring $m^2$ is overcome by the action of the regulating apparatus and its auxiliary transmitting-spring $H^2$.

The connecting-rod M is operated by the action of the levers H, I, and L and the spring $H^2$, according as the piston is raised or lowered by the expansion and contraction of the liquid in the tubes $a\ a$. The anti-friction roller $h^6$ on the pivot $h$ of the levers H and I describes an arc of a circle, as shown in dotted lines in Fig. 1, and exerts thereby a pressure on the lever L, so as to move the same sidewise on its pivot L, in the direction of the arrow in Fig. 1. The connecting-rod M is thereby operated and the supply-valve opened.

When the regulator is used with air or hot-water heating apparatus, the opening or closing of the supply-valve is accomplished in the manner described; but as a greater stroke of the lever L is required, the transmitting mechanism has to be so arranged as to impart the increased motion. This is accomplished by making the length of the toothed segment F, that meshes with the piston-rod D', as small as possible and the lever G as large as possible. For this purpose, however, it may be of advantage to remove the anti-friction roller $h'$ from the pivot $h$ of the levers H and I, and arrange it on the curved lever G, at the proper distance from the hub of the same, and the form of the lever L to correspond thereto.

The supply-valve O is arranged in a casing, O', to which the steam, air, or hot-water supply pipe S is connected. The supply-valve O is applied by a pivot-link, $p$, to the upper arm of an elbow-lever, P, that is fulcrumed to the casing O', the fulcrum $p'$ turning in suitable bearings of the casing. The lower arm of the elbow-lever P is pivoted to the stem of a balance-valve, $O^2$, which is fitted to a valve-seat in the outlet-pipe S' in front of the supply-valve O. By the pivot-link connection of the supply-valve O with the arm of the elbow-lever the valve fits always tightly to its seat.

In case steam is used as the heating medium, the water of condensation is collected at the lower part of the casing O' and passed off through a suitable drip-cock, (not shown in the drawings,) so that the supply-valve is always above the level of the water of condensation in the casing. The balance-valve $O^2$ facilitates the easy play of the supply-valve O, so that the same responds quickly to the action of the regulating apparatus.

In some cases it may be of advantage to use a simpler and smaller form of apparatus, which can be accomplished by pivoting the lever H directly to the piece G', and dispensing thereby with the steadying-lever I and lever-arm G, and arranging the anti-friction roller $h'$ on the piece G', so as to press on the lever L. When it should not be desired to regulate the heat at a certain fixed temperature, the ring-shaped part G' of the lever G can be dispensed with, in which case the lever G is directly connected to the lever L. A still simpler form of the regulating apparatus is obtained by dispensing entirely with the lever G and its ring-shaped part G' and levers I and L, and connecting the lever H and the governing-rod M directly to the segment F and its arm F'. A very reliable and sensitive regulator for heating apparatus is thereby obtained, by which the temperature of the space to be heated is indicated and regulated in a reliable and automatic manner.

Having thus described my invention, I claim as new and desire to secure by Letters Patent—

1. The combination of a closed vessel containing an expansible liquid, a cylinder connected thereto, a piston within said cylinder, a piston-rod having a rack-shaped portion, a toothed segment, intermediate spring-actuated lever mechanism, a supply-valve, and a governing-rod connecting said lever mechanism with the supply-valve, substantially as set forth.

2. The combination, in a regulator for heating apparatus, of a closed vessel containing an expansible liquid, a cylinder connected thereto, a piston guided in said cylinder and provided with a rack-shaped piston-rod, a transmitting-lever having a toothed segment, said lever moving along a scale of the supporting-plate, an oil-receptacle arranged alongside of the cylinder and connected with the cylinder and said closed vessel, and means for establishing or interrupting the communication of said oil-receptacle with the cylinder, so as to readjust the position of the transmitting-lever, substantially as set forth.

3. The combination of a closed vessel containing an expansible liquid, a cylinder having an enlarged upper part, a piston having a rack-shaped piston-rod, a transmitting-lever having a toothed segment meshing therewith, said lever moving along a scale of the supporting-plate, an oil-receptacle arranged alongside of the cylinder and connected with the same and the closed vessel, a stop-cock located in the channel leading to the oil-receptacle, and an inclined channel connecting the upper part of the cylinder with the oil-receptacle, substantially as set forth.

4. The combination of a closed vessel, A, containing an expansible liquid, a cylinder, C, connected therewith, a piston, D, having rack-shaped piston-rod D', a toothed segment, F, having an upwardly-extending arm, F', and a downwardly-extending arm, F², the latter being provided with a set-screw, f', having screw-nuts f², a transmitting lever-arm, G, having a ring-shaped part, G', connected to the arm F², a spring-actuated lever, H, a steadying-lever, I, a transmitting-lever, L, a spring-pressed connecting-rod, M, a crank-arm, N, and a balanced supply-valve, O, substantially as set forth.

5. The combination of a closed vessel, A, containing an expansible liquid, a cylinder, C, connected therewith, a piston, D, having a rack-shaped piston-rod, D', a toothed segment, F, having arms F' F², a lever-arm, G, having a ring-shaped part, G', connected adjustably to the arm F², a spring-actuated lever, H, a steadying-lever, I, pivoted to the lever H, an oscillating transmitting-lever, L, a spring-actuated connecting-rod, M, a crank-arm, N, and a balanced supply-valve, O, substantially as set forth.

6. The combination of a closed vessel containing an expansible liquid, a cylinder connected thereto, a piston having a rack-shaped piston-rod, a toothed segment meshing therewith, said segment having an arm moving along a scale of the supporting-plate, a transmitting lever-arm connected adjustably to a second arm of the segment, and a spring-actuated lever mechanism connected to the supply-valve of the heating apparatus, whereby the heat of the room in which the apparatus is located is regulated to a certain fixed temperature, substantially as set forth.

7. The combination of a closed vessel containing an expansible liquid, a cylinder connected therewith, a piston having a rack-shaped piston-rod, a toothed segment having indicating-arms, an intermediate spring-actuated lever mechanism, a connecting-rod, and a balanced supply-valve connected to the heating apparatus, substantially as set forth.

In testimony that I claim the foregoing as my invention I have signed my name in presence of two subscribing witnesses.

JACOB TRUEB.

Witnesses:
PAUL GOEPEL,
SIDNEY MANN.